W. H. & W. J. CLARK.
WHEEL.
APPLICATION FILED SEPT. 7, 1915.
1,182,250. Patented May 9, 1916.
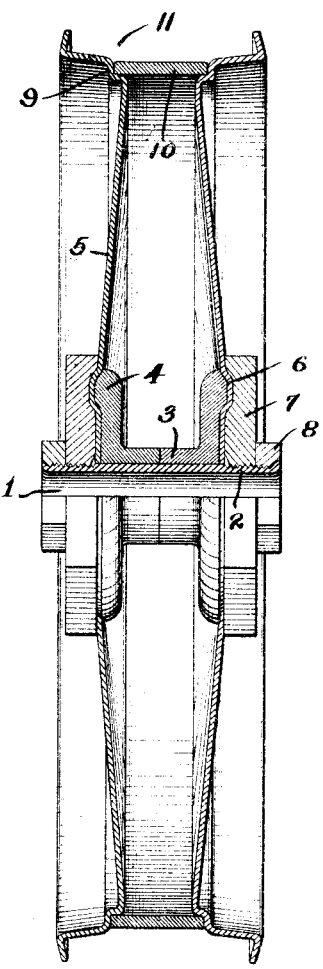
Witness:
Geo. Johnson
William H. Clark
William J. Clark
Inventors
by James W. See
Attorney

UNITED STATES PATENT OFFICE.

WILLIAM H. CLARK AND WILLIAM J. CLARK, OF SALEM, OHIO, ASSIGNORS TO THE W. J. CLARK COMPANY, OF SALEM, OHIO.

WHEEL.

1,182,250.  Specification of Letters Patent.  Patented May 9, 1916.

Application filed September 7, 1915. Serial No. 49,189.

*To all whom it may concern:*

Be it known that we, WILLIAM H. CLARK and WILLIAM J. CLARK, citizens of the United States, residing at Salem, Columbiana county, Ohio, have invented certain new and useful Improvements in Wheels, of which the following is a specification.

This invention pertains to wheels designed for use with trucks, etc., and formed mainly of a pair of sheet metal side sections. In wheels of this class when used for heavy or rough work, considerable difficulty is experienced in securing maintained integrity at the center of the wheel where the sheet metal side sections are secured to the hub. This is owing largely to the thinness of the metal of which the side sections are formed, the thinness of the metal being due to a desire for lightness and for economy of material. The edge of the sheet metal at the eye in the side sections does not give adequate bearing radially from the hub.

Again, in recognition of the rather flexible character of the sheet metal side sections, it has been customary to dish these side sections to a very considerable degree so as to get a bracing effect, this considerable dishing, however, lessening to material extent the radial strength of the sheet metal side sections, and, in ordinary circumstances necessitating the employment of sheet metal of undesired thickness.

Our invention looks to the improvement of sheet metal wheels in order to lessen the difficulties above referred to.

Our invention will be readily understood from the following description taken in connection with the accompanying drawing which is a diametrical section of a wheel exemplifying our improvements, the lower half of the hub appearing in elevation.

In the drawing:—1, indicates the central portion of the hub, which in the illustrated example is a box; 2, exterior threads at the end of the box; 3, a circular spacer disposed upon the exterior of the box, and preferably formed in two pieces to facilitate the process of manufacture, this spacer being reduced in diameter at its center of length in order to avoid undue weight of material; 4, annular beads projecting outwardly from the ends of the spacer, concentric with the box; 5, the circular sheet metal side sections which we will call webs, having central eyes fitting on the box, these webs lying against the exterior faces of the spacer, the webs having some degree of dishing in order to get a bracing effect; 6, annular recesses struck outwardly from the inner surfaces of the webs and conforming to the radially inner and radially outer surfaces of the annular beads 4 of the spacer, the outer surfaces of the webs at these struck-up recesses having a form corresponding with the radial contour of the annular recesses; 7, a disk screwed upon each end of the box and clamping the central portion of the webs tightly against the ends of the spacer, the disks 7 being provided on their inner faces with recesses corresponding with the radial contour of the metal at the struck-up grooves so that the metal of the webs is firmly clamped to the ends of the spacer and to the radially inner and outer portions of beads 4, said disks extend and converge beyond the spacer; 8, locknuts screwed upon the box exterior to clamping disks 7, the ends of the box being preferably riveted or up-set at the outside of these locknuts; 9, annular depressions formed at the inner surfaces of the peripheries of the webs; 10, a band fitting within these depressions and acting as a spacer between one web and the other; and 11, the general periphery of the wheel, which in the present case is illustrated as being of grooved form suited for the reception of a rubber tire.

While we have illustrated the periphery of our improved wheel as adapted to a rubber tire, the periphery of the wheel may have any of the usual cross-sectional forms by which wheels may be adapted for the employment of metallic tires, or for the employment of the periphery of the wheel without any additional tire of any character.

The radial strains on the webs are met by the contact of the surfaces of the metal forming the recesses 6 with the radially inner and outer surfaces of the annular recesses in the disks 7 and of the beads 4, thus lessening the duty of radial resistance imposed upon the thin edges of the metal of the webs where they surround the box. The portions of the webs between the hub-structure and their peripheries are separated from each other at all points to such extent as to best utilize the radial strength of the webs, consistent with some degree of dishing to endow the webs with a sidewise bracing capacity. The band 10 serves as a spacer for the webs at their peripheries and also serves as a strengthener and stiffener, both sidewise and radially, and in case no extraneous tire is employed, this band provides the periphery of the wheel with a central portion of superior thickness and strength.

All of the features of our improved construction may be employed in a wheel, or some of the features may be employed in the absence of other features.

We claim:—

1. A wheel comprising, a central hub-portion, the ends of said hub portion being externally screw threaded, a spacer disposed thereon, beads formed on the outer ends of the spacer concentric with the axis of the wheel, sheet metal webs fitted upon the central hub-portion against the ends of the spacer and having struck-up recesses fitting said beads, disks screwed upon the central hub-portion and against said webs and provided upon their inner faces with recesses engaging the outer surfaces of the webs, and means for locking said disks, combined substantially as set forth.

2. A wheel comprising a central hub-portion, a spacer disposed thereon, beads formed on the outer ends of the spacer concentric with the axis of the wheel, sheet metal webs fitted upon the central hub-portion against the ends of the spacer and having struck-up recesses fitting said beads, disks disposed upon the central hub-portion and provided upon their inner faces with recesses engaging the outer surfaces of the webs, said disks extending and converging beyond said spacer, and means causing the disks to clamp the webs between the disks and the spacer, combined substantially as set forth.

3. A wheel comprising a central hub-portion, a spacer disposed thereon, beads formed on the outer ends of the spacer concentric with the axis of the wheel, sheet metal webs fitted upon the central hub-portion against the ends of the spacer and having struck-up recesses fitting said beads, said webs having their peripheral portions separated from each other and provided with annular depressions at their peripheries, a band disposed between the webs and lying in said annular depressions, disks disposed upon the central hub-portion and provided upon their inner faces with recesses engaging the outer surfaces of the webs, said disks extending and converging beyond said spacer, and means causing the disks to clamp the webs between the disks and the spacer, combined substantially as set forth.

WILLIAM H. CLARK.
WILLIAM J. CLARK.

Witnesses:
W. S. Greene,
D. Bailey.